Oct. 20, 1959  C. VAN DER LELY ET AL  2,909,023
ROTARY RAKING WHEEL
Original Filed Nov. 9, 1953  2 Sheets-Sheet 2

INVENTORS
Cornelis van der Lely
and Ary van der Lely
BY

# United States Patent Office 2,909,023
Patented Oct. 20, 1959

2,909,023

ROTARY RAKING WHEEL

Cornelis van der Lely and Ary van der Lely, Maasland, Netherlands, assignors, by mesne assignments, to C. van der Lely Canada Ltd., Ottawa, Ontario, Canada, a corporation of Canada Original application November 9, 1953, Serial No. 390,981, now Patent No. 2,860,478, dated November 18, 1958. Divided and this application October 13, 1958, Serial No. 766,962

15 Claims. (Cl. 56—377)

This invention relates to raking members, and more particularly to raking members for use in raking devices having a mobile frame and a substantially horizontal axle upon which one or more raking members are mounted at an angle to the direction of movement of the frame. The raking members in such devices are rotated by their contact with the ground and rakable substance during movement of the mobile frame. The periphery of each raking member has teeth for moving rakable substance over the ground, such teeth being mounted to permit their deflection when the teeth are under a load.

In existing raking devices of this kind, means are provided which permit variation of the elevation of the axle carrying the raking member in its relation to the frame. For example, the axle may be formed by the crankpin of a crank rotatably mounted on the frame. The use of such an arrangement in a device having a plurality of raking members arranged in a row will permit the raking members to adjust themselves individually with respect to elevation so that a row of raking members is adaptable to substantial unevenness in the terrain. Existing devices depend upon deflection of the circumferential teeth of the raking members for their adaptation to small irregularities or unevenness in the terrain. However, when the teeth of existing raking members undergo even a relatively small deflection, their ability to displace the substance lying on the ground in the desired direction is diminished or lost as the deflected teeth, being less vertical in their position, tend to drag over the rakable substance.

Accordingly, an object of this invention is to provide raking members or raking wheels particularly adapted for use on a raking device as described and having teeth capable of a high degree of deflection without losing or diminishing their ability to carry along the rakable substance.

In accordance with the invention, the above objective is realized by providing means which retain the teeth of the raking member in favorable positions to perform their raking function, whether the teeth are in a normal condition, or in a substantially deflected condition.

The foregoing characteristic in raking wheels embodying this invention results in the following advantages:

(a) The raking wheels provide a more efficient raking operation resulting in a smaller loss of the rakable substance or material since less material will remain on the ground following passage of the raking device;

(b) Very uneven terrain may be worked effectively;

(c) The raking device requires a smaller number of raking members or wheels for the same width than normally necessary in conventional raking members and as a result is less expensive; and (d) The axles of the raking members may be rigidly secured to the frame of the raking device since the adaptation of the raking members to the contours of the ground can be effected solely by deflection of the teeth, rather than by bodily displacement of the raking members as heretofore.

Still further objects, features, advantages and details of the present invention will appear in the following description which is to be read in connection with the accompanying drawings in which various embodiments of the invention have been illustrated by way of example.

This is a division of our application filed November 9, 1953, Serial No. 390,981, now Patent No. 2,860,478.

Figure 1:
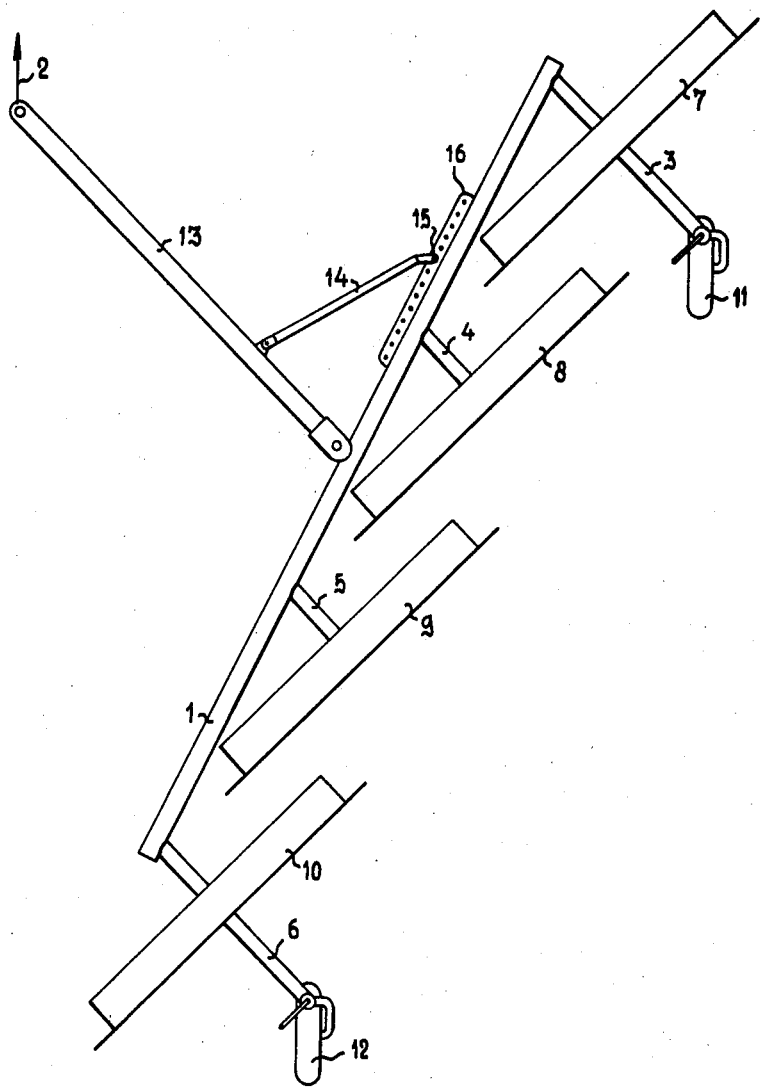
Figure 1 is a top plan view of a raking device of the kind on which raking members embodying the present invention are to be used.

Referring to the drawings in detail and initially to Figure 1, a side delivery rake of the kind on which raking members constructed in accordance with the present invention are to be employed, there is shown a frame formed by an elongated beam 1 extending obliquely with respect to the normal direction of movement of the device, as indicated by the arrow 2. Four parallel axles 3, 4, 5 and 6 are rigidly secured to the beam 1 and extend therefrom substantially horizontally. The axles 3, 4, 5 and 6 carry rotatable raking members 7, 8, 9 and 10, respectively.

The end axles 3 and 6 carry running wheels 11 and 12 which support the frame and maintain the latter at a predetermined elevation above the ground. The wheels 11 and 12 are preferably self-adjusting or swivel wheels which may, if desired, be locked in any position. An adjustable draw arm 13 is hingedly connected to the beam 1 permitting an arc of movement relative to the latter in a substantially horizontal plane. The arm 13 may be locked in any desired angular position relative to the beam 1 by means of a rod 14 which, at one of its ends, is hingedly connected to the arm 13 and has an aperture 15 at its free end. The rod 14 may be arranged with its aperture 15 above any of the corresponding apertures provided in member 16 secured to beam 1. Thus the rod 14 may be secured in a position by means of a pin or bolt extending through the aperture of the rod 14 and the aligned aperture of member 16.

Figure 2:
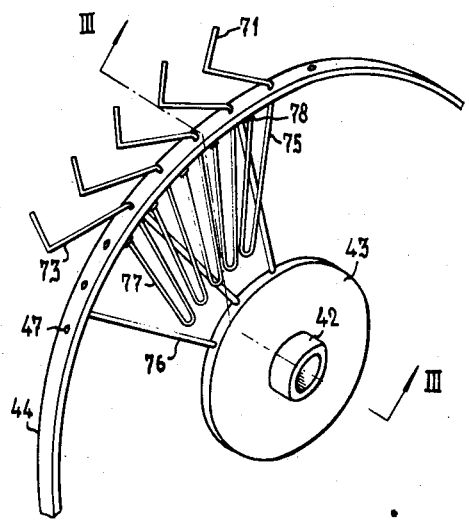
Figure 2 is a fragmentary perspective view of a raking member constructed in accordance with this invention.

In the raking member shown in Figure 2, a rim 44, having a number of apertures 47 radially therethrough, is rigidly connected to a disc 43 by means of spokes 76. The raking member is provided with a hub 42 which carries the disc 43. Both the rim 44 and the disc 43 are circular and are concentric with the hub 42. A plurality of steel wires are secured to the inner side of rim 44 at 78. A first portion, comprising a first torsion means 77, of each of said steel wires extends inwardly toward the disc 43. However, before reaching the disc 43, the wire portion 77 is reverted or bent back approximately 180 degrees and a second portion of the steel wire, forming a second torsion means 75, extends back to the rim 44 and through an aperture 47 in said rim, each of said apertures 47 functioning as a bearing means for one torsion means 75.

As a result of this construction each torsion means 75, insofar as its torsional stiffness is concerned, behaves approximately like a resilient rod which is rigidly fixed at one end and has a length equal to the sum of the lengths of both portions 75 and 77. Immediately beyond the rim 44 each steel wire is bent substantially at right angles to extend outwardly substantially tangential to the rim 44 and thereby forming a supporting member 73 for the raking tooth 71. It will be seen that each steel wire (comprising a tooth 71, a supporting member 73, second torsion means 75, and first torsion means 77) in Figure 2 has a sharp bend at substantially right angles between the teeth 71 and the related supporting member 73. The raking tooth 71 thus extends outwardly with respect to the raking member.

For clarification of language contained in the claims, it is to be noted that first torsion means 77, second torsion means 75, supporting member 73, and tooth 71 comprise the first portion, second portion, third portion, and fourth portion, respectively of each resilient rod.

In order to keep the teeth 71 situated in a single plane when not under load, an abutment (not shown) may be provided on the rim 44 against which the supporting members 73 may rest as a result of a relatively small torsional prestressing of the torsion means 75.

In this embodiment of the invention no provision is made for preventing the penetration of breakable substance from the teeth 71 into the space between adjacent supporting members 73. When the raking member is adjusted so as to be disposed at a favorable elevation above the ground, the teeth 71 will engage only a small quantity of rakable substance since the greater part of the rakable substance is displaced by the rim 44 and by parts of the raking member located within the rim. This small quantity of rakable substance engaged by the teeth 71 drops from the latter before the teeth 71 and related supporting member 73 have reached a position in which the raked material could move downward along the supporting members 73 to the rim 44.

In order to keep the teeth 71 situated in a single plane so long as they are not under load and therefore not deflected, it is desirable to provide abutment on the rim 44 (not shown) against which the supporting members 73 rest as a result of relatively small torsional prestressing of the torsion means 75.

Figure 3:
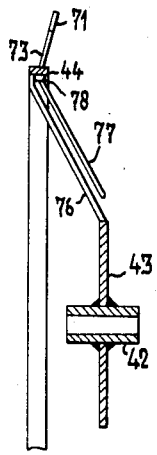
Figure 3 is a sectional view of the raking member shown in Figure 2 through section line 3—3 in Figure 2.

In the preferred embodiment of this invention, the disc and rim members lie in different planes as shown in Figure 3. Thus it will be noted from Figure 3 that the raking member is disposed laterally with the hub 42 being forward of the rim 44 and each being spaced in distinct but parallel planes.

Figure 4:
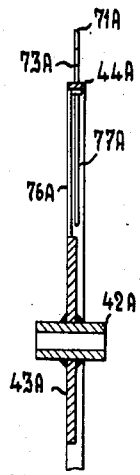
Figure 4 is a sectional view similar to Figure 3, but illustrating a modification of the raking member shown in Figure 2.

In the embodiment of Figure 4, wherein the various parts are identified by the same reference numerals employed in connection with the corresponding parts in Figures 2 and 3, but with the letter A appended thereto, the various parts of the raking members of Figure 4 are all disposed in substantially one radial plane. Thus in Figure 4, the rim 44A, the first torsion means 77A, the second torsion means 75A, the supporting members 73A, the spokes 76A, the raking teeth 71 are all disposed in the radial plane passing through the disc 43A of the raking member.

The raking members illustrated in the drawings present supporting members for the raking teeth which, if not coplanar with the rim, are directed forward in the direction of rotation. However, it is also possible that the supporting members may be directed backwards.

It will be understood that the supporting members need not be rectilinear. A curved form may be advantageous in certain cases. Numerous other variations in the described construction are possible.

The above description and drawings disclose a single embodiment of the invention, and specific language has been employed in describing the several figures. It will, nevertheless, be understood that no limitations of the scope of the invention are thereby contemplated, and that various alterations and modifications may be made such as would occur to one skilled in the art to which the invention relates.

We claim:

1. A raking member comprising a hub rotatable about an axis, a rim member having radial openings therethrough, said rim member being outwardly spaced from said hub and substantially concentric therewith, spoke members interconnecting said hub and said rim member, resilient rods associated at one end with said rim member, each of said rods having a first portion extending inwardly from said rim member and a second portion extending from the inboard end of said first portion outwardly through one of said openings in said rim member, said resilient rods each having a third portion on the outside of said rim member extending at an angle to said second portion and said resilient rods each having a fourth raking portion extending outwardly from said third portion.

2. A raking member according to claim 1 wherein the part of said resilient rod comprising said first and said second portions thereof is substantially U-shaped, each of said second portions of said resilient rods extending through an opening in said rim member adjacent to where said rim member and the first portion of the same related resilient rod are associated.

3. A raking member according to claim 1 wherein the parts of said resilient rod comprising said first and said second portions thereof are torsion means for said third portion and said fourth raking portion of said resilient rods whereby said latter portions of said resilient rods are permitted an arc of movement.

4. A raking member according to claim 1 wherein said third portion of each of said resilient rods is substantially at right angles relative to said second portion.

5. A raking member according to claim 1 wherein said fourth raking portion of each of said resilient rods extends outward in respect to said rim member and at substantially a right angle to the related said third portion of each of said resilient rods.

6. A raking member according to claim 1 wherein the third portions of said resilient rods are prestressed so that an initial deflection of the resilient rod will be met by an appreciable restoring force.

7. A raking member according to claim 6 wherein the third portions of said resilient rods are disposed for pivotal movement from said first and second portions of said resilient rod.

8. A raking member according to claim 6 wherein abutments are provided against which the third portions of said resilient rods rest under the action of said prestressing.

9. A raking member comprising a hub rotatable about an axis, a rim member having radial openings therethrough, said rim member being spaced outwardly from said hub and substantially concentric therewith, a disc member rigidly connected to said hub and substantially concentric therewith, spoke means each rigidly connected at one end to said disc and at the other end to said rim member, resilient rods, and means rigidly connecting one end of each of said resilient rods to said rim member, each of said resilient rods having a first portion extending inwardly from said clamp means for a distance less than the radius of said rim members, each of said resilient rods having a second portion extending outwardly from the inboard end of said first portion and through an opening in said rim member adjacent said clamp member, each of said resilient rods having a third portion extending outwardly substantially tangentially to said rim member and substantially at a right angle to the second portion thereof, and each of said resilient rods having a fourth portion extending outwardly from said rim and substantially at a right angle to the third portion thereof, each of said fourth portions being the raking teeth of said raking members.

10. A raking member according to claim 9 wherein said means rigidly connect one end of each of said resilient rods to the inside of said rim member.

11. A raking member according to claim 9 wherein the part of said resilient rods comprising said first and second portions thereof are substantially U-shaped.

12. A raking member according to claim 11 wherein said first and second portions of said resilient rods form torsion means for said third and fourth portions thereof whereby said latter portions of said resilient rods are permitted an arc of movement.

13. A raking member according to claim 12 wherein an axis for the aforesaid arc of movement is substantially parallel to said first and second portions of said resilient rods.

14. A raking member comprising a hub rotatable about an axis, a rim member having radial openings therethrough, said rim member being outwardly spaced from said hub and substantially concentric therewith, spoke members interconnecting said hub and said rim member, at least one rod affixed at one end to said rim member, said rod having a resilient portion inboard of said rim, said rod having a raking tooth supporting portion extending outwardly from said resilient portion and from said rim member through one of said openings therein, said rod having a raking tooth portion extending outwardly from said raking tooth supporting portion.

15. A raking member comprising: a central portion having a hub and a rim rotatable about an axis, rod securing means disposed between said hub and said rim member, and spokes interconnecting said hub and said rim member; a raking tooth; at least one resilient rod secured to said central portion by said rod securing means, said resilient rod being associated within said central portion with said rim at at least two locations and being substantially U-shaped therebetween, said resilient rod having at least one portion comprising supporting means for said raking tooth extending outwardly and at an angle from said rim member, and a further portion of said resilient rod comprising the aforementioned raking tooth extending outwardly at an angle from said resilient rod's first mentioned portion comprising a supporting member for the raking tooth.

References Cited in the file of this patent
UNITED STATES PATENTS

| | | |
|---|---|---|
| 2,486,766 | Stenzel | Nov. 1, 1949 |
| 2,652,679 | Krause | Sept. 22, 1953 |
| 2,713,241 | West | July 19, 1955 |